(12) United States Patent
Hulkkonen et al.

(10) Patent No.: US 8,660,571 B2
(45) Date of Patent: Feb. 25, 2014

(54) POSITIONING-TRIGGERED HANDOVER

(75) Inventors: Tony Hulkkonen, Helsinki (FI); Juha Back, Helsinki (FI); Janne Markus Muhonen, Helsinki (FI)

(73) Assignee: Nokia Corporation, Espoo (FI)

(*) Notice: Subject to any disclaimer, the term of this patent is extended or adjusted under 35 U.S.C. 154(b) by 393 days.

(21) Appl. No.: 12/567,467

(22) Filed: Sep. 25, 2009

(65) Prior Publication Data

US 2010/0009652 A1   Jan. 14, 2010

Related U.S. Application Data

(63) Continuation of application No. 10/508,134, filed as application No. PCT/IB03/00996 on Feb. 26, 2003, now Pat. No. 7,613,469.

(30) Foreign Application Priority Data

Mar. 26, 2002 (GB) .................................. 0207129.8

(51) Int. Cl.
*H04W 72/00* (2009.01)

(52) U.S. Cl.
USPC ....................................................... 455/452.2

(58) Field of Classification Search
USPC ............... 342/457; 455/436, 428, 456, 432.1, 455/342, 404, 439, 404.1, 456.1, 456.2, 455/513, 161.3, 433; 709/217
See application file for complete search history.

(56) References Cited

U.S. PATENT DOCUMENTS

| | | | |
|---|---|---|---|
| 5,596,625 A | 1/1997 | LeBlanc | |
| 5,754,945 A | 5/1998 | Lin et al. | |
| 5,826,188 A * | 10/1998 | Tayloe et al. | ................. 455/428 |
| 6,047,182 A | 4/2000 | Zadeh et al. | |
| 6,091,362 A | 7/2000 | Stilp et al. | |
| 6,236,849 B1 * | 5/2001 | Reudink et al. | ............... 455/342 |
| 6,377,804 B1 | 4/2002 | Lintulampi | |

(Continued)

FOREIGN PATENT DOCUMENTS

| | | |
|---|---|---|
| CA | 2 289 049 A1 | 6/2000 |
| CA | 2 414 066 A1 | 1/2002 |

(Continued)

OTHER PUBLICATIONS

Canadian Office Action for corresponding CA Application No. 2,480,348, May 31, 2007, Canada.

(Continued)

*Primary Examiner* — Kiet Doan

(74) *Attorney, Agent, or Firm* — Ditthavong Mori & Steiner, P.C.

(57) ABSTRACT

A method for estimating the location of a terminal operating in a communication system having at least two networks having overlapping areas of coverage, each network supporting at least one method for estimating the location of the terminal, and the terminal being in communication with a first one of the networks, the method comprising: assessing which of the networks is likely to form the more accurate estimate of the location of the terminal; and if that is the first one of the networks, estimating the location of the terminal by means of the first one of the networks, and if that is a second one of the networks, handling over the terminal to the second one of the networks and estimating the location of the terminal by means of the second one of the networks.

18 Claims, 1 Drawing Sheet

(56) References Cited

U.S. PATENT DOCUMENTS

| | | | |
|---|---|---|---|
| 6,591,103 B1* | 7/2003 | Dunn et al. | 455/436 |
| 6,829,481 B2* | 12/2004 | Souissi | 455/436 |
| 6,952,171 B2* | 10/2005 | Puccioni | 340/932.2 |
| 2008/0102787 A1 | 5/2008 | Landschaft et al. | |
| 2008/0242305 A1 | 10/2008 | Kahlert et al. | |

FOREIGN PATENT DOCUMENTS

| | | |
|---|---|---|
| GB | 2 362 297 A | 11/2001 |
| KR | 20090066571 A | 6/2009 |
| WO | 98/00988 | 1/1998 |
| WO | 00/27051 A2 | 5/2000 |
| WO | 00/44189 A1 | 7/2000 |
| WO | 01/61373 A1 | 8/2001 |
| WO | 02/01902 A1 | 1/2002 |
| WO | 02/067617 A1 | 8/2002 |
| WO | 2009/113928 A1 | 9/2009 |

OTHER PUBLICATIONS

Chinese Office Action for corresponding CN Application No. 038068133, Jun. 26, 2009, China.

Chinese Office Action for corresponding CN Application No. 038068133, Oct. 23, 2009, China.

Canadian Office Action for corresponding CA Application No. 2,480,348, Jun. 1, 2010, Canada, pp. 1-4.

* cited by examiner

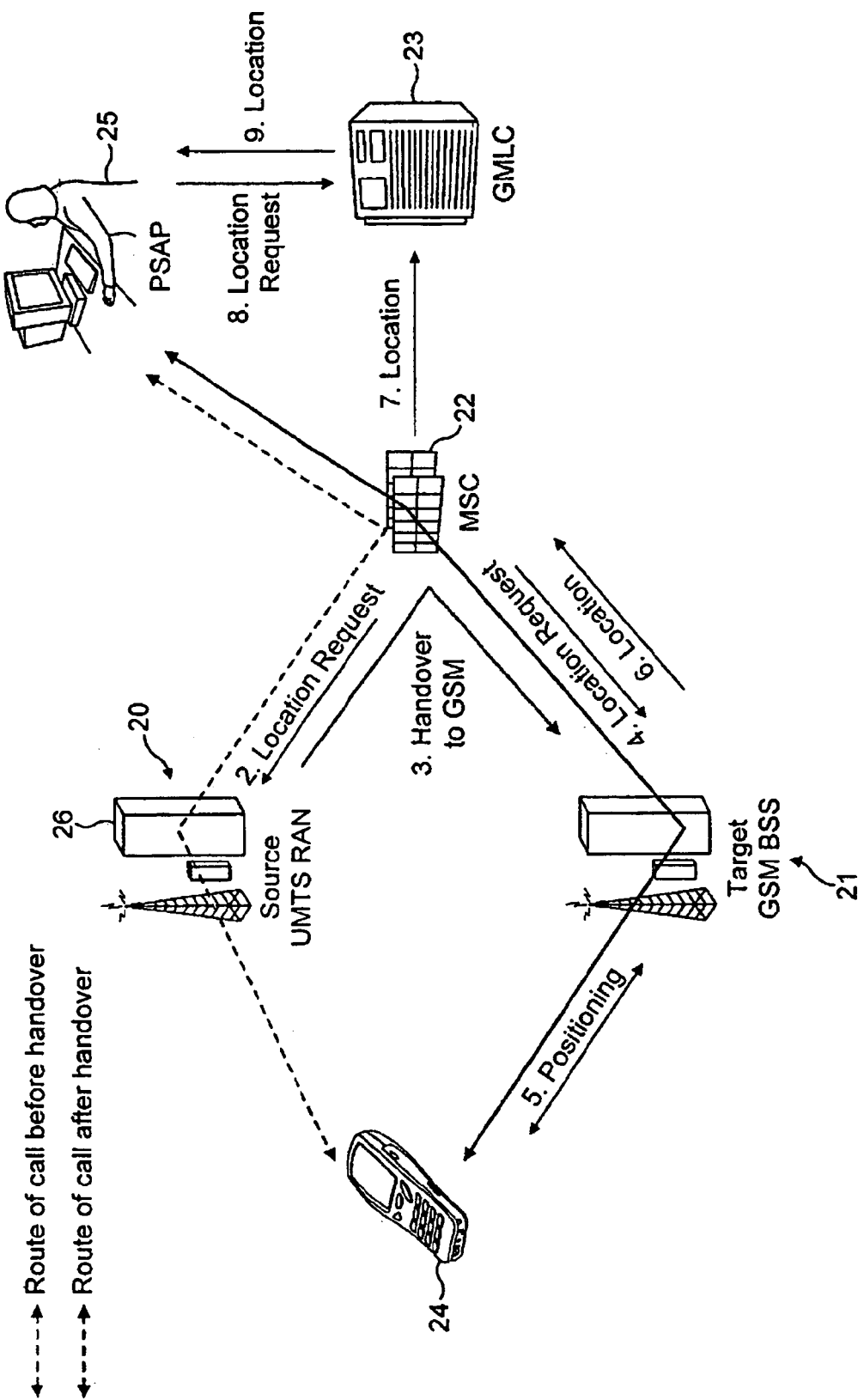

POSITIONING-TRIGGERED HANDOVER

CROSS-REFERENCE TO RELATED APPLICATIONS

This application is a continuation of and claims priority to U.S. patent application Ser. No. 10/508,134, filed Sep. 17, 2004, which is a national phase application under 35 USC 371 of International Application PCT/IB03/00996, filed Feb. 26, 2003, and incorporated herein by reference in their entireties.

BACKGROUND OF THE INVENTION

1. Field of the Invention

This invention relates to handover in communication systems, and especially to handovers that can assist in enabling the positioning of devices operating in such systems.

(2) Description of Related Art

Positioning or locating services (LCS) are becoming an important aspect of communication systems such as mobile telephony systems. These services allow the location of a user terminal or user equipment (UE) to be estimated. Knowledge of the location may be of interest to the user of the UE, and can also be used to offer the user additional services based on his location. One valuable advantage is that if the user uses his UE to make a call to the emergency services, knowledge of the location of the user could help the emergency services to offer assistance rapidly.

There are a number of ways in which the location of the UE can be estimated, but in one typical way timing differences are calculated for communications between the UE and a number of base stations. Using the timing differences the distance between the UE and each of the base stations can be estimated, and then with knowledge of the locations of the base stations the position of the UE can be triangulated.

One example of the types of system in which such services can be provided is a mobile telephony system, for example a cellular telephony system.

On the implementation of the proposed 3G (Third Generation) or UMTS (Universal Mobile Telephony System) system, it is planned that LCS will be supported by a number of cellular network systems. Examples include older GSM (Global System for Mobile Communications) standard networks operating according to the 3GPP standard for LCS, together with full 3G/UMTS standard networks, also standardized by 3GPP.

When a user is communicating in a region where older GSM networks and UMTS networks fully or partially overlap, it is intended that the networks and the user's terminal will be capable of operating so that the terminal can switch from communicating in one network to communicating in another. For example, in the situation where the networks' coverage partially overlaps, a user may move from a location where there is coverage from one of the networks to an adjaCent location where there is coverage from another of the networks. It is intended that as he does so, his terminal will be handed over from the first network to the second so that the user can continue to communicate. Even when the networks overlap entirely, a user's terminal may be handed over from network one to the other, for example to satisfy capacity constraints.

It can be expected that there. will be differences between the LCS capabilities of networks of different standards. For example, the methods that they support for determining the position of a terminal may be different. As a result, even though their standards are commonly set, there may be differences in the LCS capabilities between the networks. Due to those differences one of the networks may be better suited than another to provide LCS for a particular purpose. As a result, when a user's terminal is in a location where there is overlapping coverage from two or more interoperable systems and a need to locate the user arises, there can be situations in which a particular one of the networks that provides coverage there best fulfils the positioning requirements in that situation. However, at the time when the need arises to locate the user, the user's terminal might be connected to another network than the preferred one that is best able to fulfil the positioning requirements.

There may also be situations where due to the capabilities of the user's terminal it is more preferable to determine its location using one network than another. For example, the terminal might support the E-OTD method in GSM but might not support any of the positioning methods standardized for WCDMA (such as IPDL-OTDOA and A-GPS). This situation may be considered very likely to happen, because location services standards for GSM have been finalized before those of UMTS, and so terminals that support the GSM methods can be expected to be produced first.

The current requirements specified by the U.S. FCC Phase II Mandate set out strict requirements for positioning of a user's terminal. The FCC's Third Report and Order (FCC 99-245) in the matter of revision of the commission's rules to ensure compatibility with Enhanced 911 Emergency Calling Systems (CC Docket No. 94-102 RM-81.43), adopted Sep. 15, 1999, states: "We adopt the following revised standards for Phase II location accuracy and reliability: For network-based solutions: 100 meters for 67% of calls, 300 meters for 95 percent of calls; For handset-based solutions: 50, meters for 67% of calls, 150 meters for 95 percent of calls". Meeting these requirements will require a very high level of performance from positioning systems.

There is therefore a need for a means by which the positioning of a terminal can be improved when it is communicating in a network other than the one that can best estimate its position.

BRIEF SUMMARY OF THE INVENTION

According to one aspect of the present invention there is provided a method for estimating the location of a terminal operating in a communication system having at least two networks having overlapping areas of coverage, each network supporting at least one method for estimating the location of the terminal, and the terminal being in communication with a first one of the networks, the method comprising: assessing which of the networks is likely to form the more accurate estimate of the location of the terminal; and if that is the first one of the networks, estimating the location of the terminal by means of the first one of the networks, and if that is a second one of the networks, handing over the terminal to the second one of the networks and estimating the location of the terminal by means of the second one of the networks.

According to a second aspect of the present invention there is provided a communication system capable of estimating the location of a terminal operating therein, the communication system comprising at least two networks having overlapping areas of coverage, each network supporting at least one method for estimating the location of the terminal, the terminal being in communication with a first one of the networks; one of the networks being arranged to assessing which of the networks is likely to form the more accurate estimate of the location of the terminal; and if that is the first one of the networks to cause the location of the terminal to be estimated by means of the first one of the networks, and if that is a second one of the networks, to cause the terminal to be handed over to the second one of the networks and to cause the location of the terminal to be estimated by means of the second one of the networks.

According to a third aspect of the present invention there is provided a method for estimating the location of a terminal operating in a communication system having at least two networks having overlapping areas of coverage, each network supporting at least one method for estimating the location of the terminal, and the terminal being in. communication with a first one of the networks, the method comprising: receiving a request for transmission of an estimate of the terminal's position to a position handling unit; assessing which of the networks is best able to provide the position handling unit with the estimate; and if that is the first one of the networks, estimating the location of the terminal by means of the first one of the networks, and if that is a second one of the networks, handing over the terminal to the second one of the networks and estimating the location of the terminal by means of the second one of the networks. Then the network that has performed the positioning can transmit the estimate to the position handling unit. The position handling unit may be an interface between one or both of the networks and an emergency call handling centre.

Preferably at least one method for estimating the location of the terminal that is supported by the first network is different from the or each such method supported by the second network. Alternatively, the networks may have one or more methods (possibly all their methods) in common; in that case the present invention is still advantageous since different levels of accuracy may be achieved in different networks due, for example, to their densities of base stations. Examples of suitable methods include E-OTD, IPDL-OTDOA and A-GPS and other methods described below. The methods used by each network preferably include at least one method that makes use of a radio network subsystem of the respective network to estimate the location of the terminal. In such methods the terminal is preferably located by measuring timing differences for radio transmissions between the terminal and stations of the radio subsystem. The said estimating of the location of the terminal is preferably performed by such means.

Preferably the first network is operable according to a first standard and the second network is operable according to a second standard different from the first standard. Alternatively the networks may be of the same type.

Most suitably the first network is operable according to a standard that provides for backward compatibility or another form of interoperability with the second standard.

One or both of the standards may be UMTS or a derivative thereof. One or both of the standards may be GSM or a derivative thereof. In one suitable embodiment the first standard is UMTS or a derivative thereof and the second standard may be GSM or a derivative thereof. Both of the standards could be cellular radio standards, but other arrangements are possible: for example, one network could be a radio cellular network and the other a WLAN (wireless local area network) network.

Preferably the terminal is capable of communicating by radio with radio access subsystems of the first and second networks and each network is arranged to estimate the location of the terminal by means of its respective radio access subsystem.

The said assessing step may be performed by the first network, preferably by an element of a radio access subsystem of the first network, and most preferably by a controller of that subsystem.

Preferably the method comprises the step of initiating an emergency call by means of the terminal through the first network, and the step of handing over the terminal to the second one of the networks comprises handing over the call to the second one of the networks. In response to the initiation of such a call a nit of the communication system (for instance an MSC) may issue a request for an estimate of the location of the terminal that initiated the call. That request may be sent to the network through which the call was initiated. The said assessing step may be performed in response to that request. Alternatively, other steps may be performed in response to that request, and the said assessing step may be performed in response to one or more outcomes of those other steps. For instance, in response to the said request may be performed the step of determining whether the first network is capable of estimating the location of the terminal to within a pre-set tolerance. The pre-set tolerance may be a specified or requested tolerance. If it is then the location of the terminal is estimated by means of the first one of the networks. Otherwise preferably said assessing step is performed.

The handover of the terminal suitably involves transfer of immediate communication with and control of the terminal from one network to another. Where a call is in operation to or from the terminal at the time that the handover occurs the call is preferably maintained during and after the handover, but rerouted through the target network.

The terminal may support one or more positioning methods. It may be that the terminal does not support any positioning methods that are in common with the first network.

The roles of the first and second networks may be reversed. There may be three or more networks.

After the positioning step has been completed the terminal may be handed over to the first network. This may be initiated by the second network. On or in initiating the handover of the terminal to the first network the second network may transmit to the second network a message requesting limitation of the conditions under which the terminal may be handing over to the first network. That limitation may be a limitation that such handover to the first network should not occur until a set time has elapsed, or until the second network has estimated the position of the terminal.

BRIEF DESCRIPTION OF THE DRAWINGS

The present invention will now be described by way of example with reference to the accompanying drawing.

FIG. 1 is a schematic diagram of a telecommunication system including two networks, and illustrating the operation of a positioning operation.

DETAILED DESCRIPTION OF THE INVENTION

In the system of FIG. 1, when a user's terminal needs to be positioned, if it is determined that the user's terminal is operating in one network but there is another overlapping network that could better fulfill the positioning operation, then the user's terminal is handed over to the other network and the location of the user's terminal is estimated by that network. Then, if appropriate, after the positioning has been completed the user's Connection can be transferred back to the network with which it was originally connected.

In the following description the positioning of a terminal during an emergency call is described. However, this is just one example of the situations in which positioning can be used and the present invention is not restricted to use with emergency calls.

FIG. 1 illustrates a procedure for performing an intersystem handover triggered by a positioning request which can not be fulfilled by the network initially serving a terminal (the "initial network") and the subsequent positioning in another network (the "target network").

FIG. 1 shows a system including radio access subsystems of two types of cellular telephony networks: a UMTS RAN (radio access network) 20 and a GSM BSS (base station subsystem) 21. The radio access subsystems are served by a common MSC (mobile switching centre) 22. The mobile switching centre is linked to a GMLC (gateway mobile location centre) 23, which can determine the location of mobile terminals such as user equipment 24 operating in a linked network. In the present example, the MSC and the GMLC are linked to an emergency call centre 25, termed a PSAP (public safety access point).

The present example relates to the operation of the system in relation to emergency calls. In this example, the following steps take place.

1. Terminal 24 is operating in communication with the UMTS network and its radio access subsystem 20. An emergency call (typically a call to 112, 999 or 911) is made by the user of terminal 24.

2. The call passes to MSC 22, which identifies it as being an emergency call. The MSC therefore routes the call to the PSAP where it can be answered by an operator. The route of the call is shown by path 1 in FIG. 1. The MSC also initiates a positioning procedure to estimate the location of the terminal 24 that has originated the call. It does this by sending a RANAP LOCATION REPORTING CONTROL message to the appropriate serving RNC (radio network controller) 26. The Client Type parameter in the message indicates Emergency Services. This message is shown by path 2 in FIG. 2.

3. The serving RNC 26 analyzes the positioning request message and determines that it is a positioning request relating to an emergency call. It checks the positioning methods available to it in relation to the subject terminal 24 to determine the level of accuracy with which it can estimate that terminal's position, and compares that expected accuracy with the accuracy required for emergency positioning (e.g. as specified in FCC 99-245). The MSC can inform the serving RNC of the required accuracy.

If it is determined that the requirements can be met then the RNC can initiate positioning of the terminal by means of the subsystem 20 of the network through which the terminal initiated the emergency call. In this situation it responds to the MSC with its estimate of the terminal's location.

However, the accuracy may be limited by the configuration of that subsystem or by the level of capability that the terminal 24 has. For example, the terminal might not support the positioning methods of the subsystem 24. If it is determined that the requirements might not be met then the RNC estimates whether the position of the terminal 24 is likely to be estimated more accurately by the subsystem 21 of the target network. If so, it initiates handover of the terminal to the other network. The RNC may initiate handover under other conditions: for instance, irrespective of any requirements it may initiate handover if it determines that the position of the terminal 24 is likely to be estimated more accurately by the subsystem 21 of the target network.

If handover is initiated the RNC does not reply to the MSC with an estimate of the user's location. Instead, the RNC initiates handover to the target network (in this example a GSM network). This is shown by path 3 in FIG. 1.

The handover request may be a normal handover request. However, it may be advantageous for the request to include information to indicate that the terminal is not to be handed back to the initial network immediately. In normal circumstances intersystem handover may be triggered if the communication conditions with a terminal are significantly better with one network than with another. If communication conditions between the terminal and the target network were significantly worse than those between the terminal and the initial network then it could happen that immediately after the present handover the terminal could be handed back to the initial network. This would prevent the target network from performing the positioning itself. Therefore, the intersystem handover request may include—information to inhibit such a situation from occurring. The information may be passed in the form of the message or in a parameter attached to the message. The information may specify that the terminal is not to be handed back to the initial network until positioning has been performed, or that it is not to be handed back to the initial network until a set period of time has elapsed.

4. The call initiated by terminal 24 is handed over to the target network so that terminal is now served by radio access subsystem 21. As normal, the MSC is aware that intersystem handover has taken place. After the handover has taken place the MSC reinitiates the positioning procedure by transmitting another positioning request, this time to the GSM BSS 21. This is shown by path 4 in FIG. 1. Messages for individual positioning methods are suitably transferred as described in 3GPP TS 03.71 (Rel-:98, Rel-99) or 3GPP TS 43.059 (Rel-4 onwards). This step could be omitted if the details of the positioning request were carried in the intersystem handover request message.

5. The subsystem 21 estimates the position of the terminal 24 and returns its position estimate to MSC 22. The subsystem 21 may include a positioning component for performing this function. For example, in the case of a GSM system the position estimate is generated by the SMLC (serving mobile location centre), and in UMTS relevant functions are provided by functional components of the RNC. This message is shown by path 6 in FIG. 1.

6. The MSC 22 forwards the position estimate to GMLC in a MAP SUBCRIBER LOCATION REPORT message. This is shown by path 7 in FIG. 1. The GMLC stores the initial position information and other relevant information about the emergency call in order to support subsequent location retrieval (NCAS Pull) from the PSAP. The GMLC also acknowledges the receipt of the location information.

7. The PSAP requests, from the GMLC the initial position of the emergency caller. This is shown by path 8 in FIG. 1.

8. The GMLC provides the initial position estimate to the PSAP. This is shown by path 9 in FIG. 1. With the estimated location of the terminal 24 an operator at the PSAP can direct emergency support such as police, fire services or an ambulance to the user's location.

In this example the decision to initiate intersystem handover is taken by a UMTS RNC. Other network entities, in UMTS and GSM systems, could make the decision. To avoid unnecessary intersystem handovers, the unit(s) making such decisions should preferably have knowledge of:

a. the extent of overlap of coverage between networks—so that it can be determined which networks are candidates for fulfilling a positioning request;

b. the networks' positioning capabilities (e.g. which positioning protocols they support)—so that the likely accuracy of positioning a terminal of certain capabilities can be properly judged; and c. the methods of positioning with which the terminal is compatible.

It may also be desirable for those unit(s) to have knowledge of any requirements for positioning accuracy.

The assessment of which network is likely to provide the best position estimate can be triggered by a number of factors. In the above example it was triggered by the Client Type parameter received in the positioning request. Another example is for the assessment to be triggered by a requested quality of service (QoS) in the positioning request.

Alternatively, or in addition, account could also be taken of the networks capabilities for sending information on the position estimate to the PSAP. If for some reason (e.g. incompatibility or fault) one of the networks cannot transmit a position estimate to the PSAP then handover may be performed to another network that can do so, in the way described above.

The present approach applicable in the circuit switched (CS) and packet switched (PS) domains. In the PS domain instead of the above-described form of intersystem handover, network initiated intersystem cell reselection would be performed.

The approach described above could be used in situations other than emergency calls. For example, an accurate location of a terminal may be desired to locate a stolen terminal or to allow a taxi to be routed precisely to someone who is unsure of their location. In the latter case a surcharge for accurate positioning could be made to the user of the terminal or to the entity (e.g. the taxi company) who requested the accurate estimate.

The present invention is preferably implemented, in a system operable according to the UMTS or GSM standard or a derivative thereof. However, it could be implemented in other systems. It is not limited to cellular radio telephony systems.

Non-limiting examples of positioning methods that may be supported by one or more networks in the present system include the following:

Global Positioning System (GPS) or other satellite-based or assisted positioning systems. Enhanced observed time difference (E-OTD).
Time of arrival (TOA).
Timing advance (TA).
Network-assisted GPS (A-GPS)
Observed time difference of arrival—idle period downlink (OTDOA-IPDL)
Cell ID The standardization of such methods for GSM is covered in chapters 4.2 to 4.4 of the 3GPP standard TS 03.71. The standardization of such methods for UMTS is covered in chapter 4.3 of the 3GPP standard TS 25.305.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method comprising:
   determining which one or more of a plurality of networks are capable of determining a location of a terminal to within a preset tolerance, wherein the preset tolerance is associated with a level of accuracy of a location of the terminal, wherein the terminal is within an overlapping coverage area of the networks; and
   selecting either one of the one or more capable networks to initiate determination of the location of the terminal, or another one of the one or more capable networks to initiate the determination of the location of the terminal after handover of the terminal from the one network to the other one of the one or more capable networks,
   wherein the handover of the terminal is initiated by a handover request that specifies the other network is not to hand back the terminal either until the location of the terminal is determined by the other network, or upon expiration of a predetermined period of time.

2. The method of claim 1, wherein the determination of the location by the one network is according to a first method, and the determining of the location by the other network is according to a second method that provides one or more different positioning capabilities from the first method.

3. The method of claim 1, wherein the one network is configured according to a first standard and the other network is configured according to a second standard that is different from the first standard.

4. The method of claim 3, wherein the first and second standards are the global system for mobile communications and the universal mobile telephony system.

5. The method of claim 1, further comprising:
   initiating establishment of an emergency call from the terminal through the one network, wherein the call is handed over to the other network as part of the handover of the terminal.

6. The method of claim 1, wherein the selection includes,
   determining extent of the overlap of the coverage area,
   determining capabilities of the one or more capable networks for determining the location, and
   determining whether the terminal is compatible with the determined capabilities of the one or more capable networks.

7. The method of claim 1, further comprising:
   receiving a positioning request for the location of the terminal, wherein the positioning request includes a parameter that triggers the location determination.

8. The method of claim 1, further comprising:
   determining which one or more of the one or more capable networks are capable of sending information on the location of the terminal to a public safety access point,
   wherein the selecting of one of the one or more capable networks to initiate determination of the location of the terminal is made further based upon determining results associated with the public safety access point.

9. A method comprising:
   determining which one or more of a plurality of networks are capable of determining a location of a terminal to within a preset tolerance, wherein the preset tolerance is associated with a level of accuracy of a location of the terminal, wherein the terminal is within an overlapping coverage area of the networks;
   selecting either one of the one or more capable networks to initiate determination of the location of the terminal, or another one of the one or more capable networks to initiate the determination of the location of the terminal after handover of the terminal from the one network to the other one of the one or more capable networks; and
   receiving a positioning request for the location of the terminal,
   wherein the positioning request includes a parameter that triggers the location determination, and
   wherein the parameter is a client type parameter specifying an emergency service that requires the level of accuracy of a location of the terminal, specifying that the terminal is not to be handed back to the one network until the other network has determined the location of the terminal, or a combination thereof.

10. An apparatus comprising:
at least one processor; and
at least one memory including computer program code,
the at least one memory and the computer program code configured to, with the at least one processor, cause the apparatus to perform at least the following,
determine which one or more of a plurality of networks are capable of determining a location of a terminal to within a preset tolerance, wherein the preset tolerance is associated with a level of accuracy of a location of the terminal, wherein the terminal is within an overlapping coverage area of the networks; and
select either one of the one or more capable networks to initiate determination of the location of the terminal, or another one of the one or more capable networks to initiate the determination of the location of the terminal after handover of the terminal from the one network to the other one of the one or more capable networks,
wherein the handover of the terminal is initiated by a handover request that specifies the other network is not to hand back the terminal either until the location of the terminal is determined by the other network, or upon expiration of a predetermined period of time.

11. The apparatus of claim 10, wherein the determination of the location by the one network is according to a first method, and the determining of the location by the other network is according to a second method that is different from the first method.

12. The apparatus of claim 10, wherein the one network is configured according to a first standard and the other network is configured according to a second standard that is different from the first standard.

13. The apparatus of claim 10, wherein the apparatus is further caused, at least in part, to:
initiate establishment of an emergency call from the terminal through the one network, wherein the call is handed over to the other network as part of the handover of the terminal.

14. The apparatus of claim 10, wherein the selection includes,
determining extent of the overlap of the coverage area,
determining capabilities of the one or more capable networks for determining the location, and
determining whether the terminal is compatible with the determined capabilities of the one or more capable networks.

15. The apparatus of claim 10, wherein the apparatus is further caused, at least in part, to:
receive a positioning request for the location of the terminal, wherein the positioning request includes a parameter that triggers the location determination.

16. The apparatus of claim 15, wherein the parameter is a client type parameter specifying an emergency service.

17. A method comprising:
identifying that a call from a terminal is associated with a particular service, wherein the terminal is served by a first network and a second network having overlapping coverage areas;
generating a positioning request for transmission to the first network for determining a location of the terminal to within a predetermined level of accuracy of a location of the terminal; and
generating another positioning request for transmission to the second network for determining a location of the terminal if the first network employs a method for determining the location that fails to satisfy the predetermined level of accuracy, wherein the first network hands over the terminal to the second network,
wherein a handover of the terminal is initiated by a handover request that specifies the second network is not to hand back the terminal either until the location of the terminal is determined by the second network, or upon expiration of a predetermined period of time.

18. An apparatus comprising:
at least one processor; and
at least one memory including computer program code,
the at least one memory and the computer program code configured to, with the at least one processor, cause the apparatus to perform at least the following,
identify that a call from a terminal is associated with a particular service, wherein the terminal is served by a first network and a second network having overlapping coverage areas;
generate a positioning request for transmission to the first network for determining a location of the terminal to within a predetermined level of accuracy of a location of the terminal; and
generate another positioning request for transmission to the second network for determining a location of the terminal if the first network employs a method for determining the location that fails to satisfy the predetermined level of accuracy, wherein the first network hands over the terminal to the second network,
wherein a handover of the terminal is initiated by a handover request that specifies the second network is not to hand back the terminal either until the location of the terminal is determined by the second network, or upon expiration of a predetermined period of time.

* * * * *